UNITED STATES PATENT OFFICE.

HENRY A. CLARK, OF BOSTON, MASSACHUSETTS.

TREATMENT OF INDIA-RUBBER AND GUTTA-PERCHA.

SPECIFICATION forming part of Letters Patent No. 263,021, dated August 22, 1882.

Application filed December 19, 1881. (No specimens.)

*To all whom it may concern:*

Be it known that I, HENRY A. CLARK, of Boston, in the county of Suffolk and State of Massachusetts, have invented certain new and useful Improvements in Treatment of India-Rubber and Gutta-Percha, of which the following is a full, clear, and exact description.

This invention relates to the treatment particularly of india-rubber and gutta-percha which has been once vulcanized and then desulphurized and devulcanized and restored, and containing more or less oils or spirits—as, for instance, spirits of turpentine, petroleum, &c.—and its purpose is to destroy and remove such spirits or oils.

To this end the invention consists in subjecting the devulcanized or restored india-rubber or gutta-percha to water under heat to a sufficient degree to produce an evaporation of the oils or spirits, and consequently their removal therefrom.

In carrying out this invention the devulcanized india-rubber or gutta-percha is immersed in water contained in any vessel suitable to be heated, as desired—as, for instance, a steam-jacketed kettle or tank or drum—and the whole subjected to heat and brought to a temperature sufficiently high to produce an evaporation of the oils or spirits in the india-rubber, &c., and so continued until by such evaporation the oils or spirits are removed as fully and practically as may be desired. Practice has shown that with the india-rubber and water under heat, as above described, for from four (4) to twelve (12) hours the desired result is secured.

The india-rubber from which the oils or spirits are removed, as above described, is found to have the sticky or "tacky" quality so common to restored india-rubber, &c., destroyed and obliterated—a quite important advantage; and again, such removal of the oils or spirits serves to solidify the gum, to make it finer in texture, and to bring it to the very best possible working condition.

India-rubber, &c., treated as described, before being worked again into manufactures, is dried of its moisture in any suitable manner, and under the aforesaid treatment it is found that the india-rubber, &c., is to a greater or lesser extent desulphurized—an important advantage.

The mode of treatment of restored vulcanized india-rubber or gutta-percha herein described is particularly applicable to vulcanized india-rubber or gutta-percha which has been restored or devulcanized and desulphurized in accordance with the schedules annexed to the several Letters Patent of the United States issued to me, respectively dated January 18, 1881, and February 1, 1881, and numbered 236,778, 236,779, and 237,249.

Having thus described my invention, what I claim, and desire to secure by Letters Patent, is—

1. The treatment of restored or devulcanized and desulphurized vulcanized india-rubber or gutta-percha with water subjected to heat to a degree sufficient to evaporate the oils or spirits contained in the india-rubber, &c., all substantially as described, for the purpose specified.

2. As a new article of manufacture, restored or devulcanized and desulphurized india-rubber having the characteristics herein specified.

In testimony whereof I have hereunto set my hand in the presence of two subscribing witnesses.

HENRY A. CLARK.

Witnesses:
EDWIN W. BROWN,
WM. S. BELLOWS.